United States Patent [19]

Jackson et al.

[11] 4,066,196
[45] Jan. 3, 1978

[54] HANDLEBAR BAG

[76] Inventors: W. Shaun Jackson, 809 Sycamore, Ann Arbor, Mich. 48104; Leslie Eric Bohm, 29560 Rutherland, Southfield, Mich. 48076

[21] Appl. No.: 640,070

[22] Filed: Dec. 12, 1975

Related U.S. Application Data

[63] Continuation-in-part of Ser. No. 473,342, May 28, 1974, Pat. No. 3,955,728.

[51] Int. Cl.² .............................................. B62J 7/06
[52] U.S. Cl. ................................... 224/30 A; 224/31; 224/36; 224/41
[58] Field of Search ................... 224/30 R, 30 A, 31, 224/32 R, 33–37, 39, 41, 43, 44; 150/28 R, 1, 33; 190/58; 24/DIG. 18; 297/DIG. 6; 280/202, 289

[56] References Cited

U.S. PATENT DOCUMENTS

| | | | |
|---|---|---|---|
| 253,211 | 2/1882 | Lamson | 224/41 |
| 398,945 | 3/1889 | Gredlebaugh | 224/41 |
| 482,938 | 9/1892 | Blood | 224/31 |
| 584,207 | 6/1897 | Carter | 224/36 |
| 599,119 | 2/1898 | Coolidge | 224/36 |
| 607,782 | 7/1898 | Erwin | 224/41 |
| 637,762 | 11/1899 | Buley et al. | 224/36 |
| 1,400,758 | 12/1921 | Mansfield | 224/41 |
| 2,424,195 | 7/1947 | Schwinn | 224/36 |
| 2,492,595 | 12/1949 | Rhoer | 224/41 |
| 2,764,329 | 9/1956 | Hampton | 224/41 |
| 2,827,096 | 3/1958 | Hinson | 150/28 R |
| 3,275,053 | 9/1966 | Kabana | 297/DIG. 6 |
| 3,786,972 | 1/1974 | Alley | 224/32 A |
| 3,853,253 | 10/1974 | Hawkins et al. | 224/39 |
| 3,888,397 | 6/1975 | Kolzomi | 224/30 A X |
| 3,903,944 | 9/1975 | Montgomery et al. | 150/28 X |
| 3,955,728 | 5/1976 | Jackson et al. | 224/31 |

FOREIGN PATENT DOCUMENTS

| | | | |
|---|---|---|---|
| 970,863 | 1/1951 | France | 224/32 A |
| 1,020,887 | 12/1957 | Germany | 224/32 A |
| 333,075 | 8/1930 | United Kingdom | 150/28 R |

*Primary Examiner*—Evon C. Blunk
*Assistant Examiner*—Carl Rowold
*Attorney, Agent, or Firm*—Krass & Young

[57] ABSTRACT

A carrier bag for transporting small, portable articles along on a cycle is supported between the handlebars. Support is provided by a bent wire carrier mounted on the handlebar stem that includes a mounting loop adapted to surround the stem, two closely spaced, parallel segments extending forwardly from the loop, and a pair of sections that diverge laterally from the outer ends of the segments and support a pair of forwardly projecting tines. The bag has a pair of elongated channels formed in opposed lateral ends to receive the tines and a pair of fasteners spaced along its rearward surface to encircle and secure the divergent sections. The elongated channels and fasteners respectively inhibit lateral and forward displacement of the bag, thereby securing it in position. A pair of elongated, tension members extend between the lower edges of the opposed sides of the bag and eyelets formed at the front fork ends adjacent to the front axle to retain the bag against upward movement and complement the support provided by the forward carrier.

In an alternative embodiment, the elongated, tension members are used in the described manner, along with a pair of elongate straps, each of which have one end attached to one of a pair of spaced points on the upper portion of the bag and which wrap around the handlebar to effectuate a secure support for the bag.

19 Claims, 6 Drawing Figures

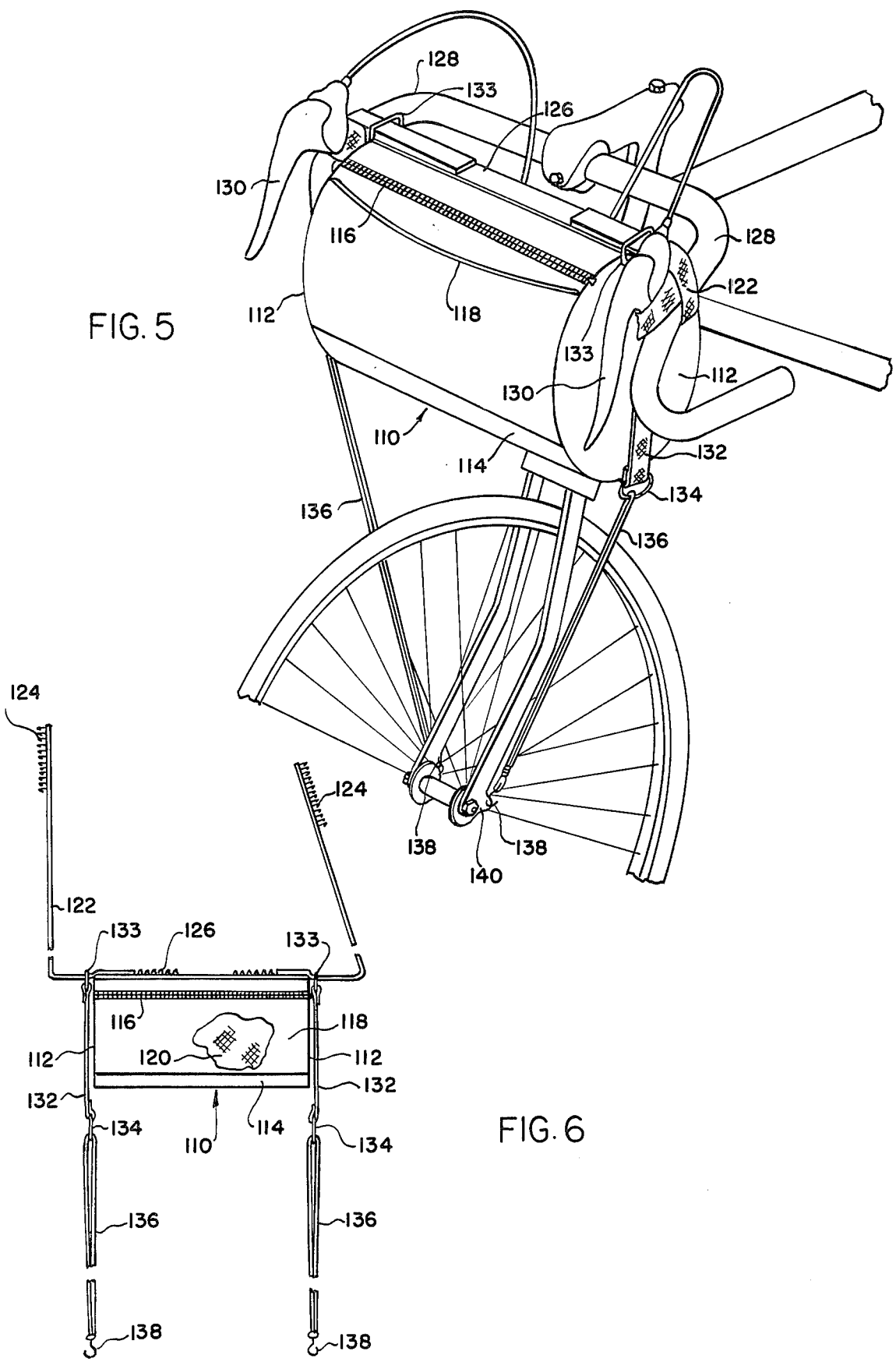

HANDLEBAR BAG

REFERENCE TO RELATED APPLICATION

This application is a continuation-in-part of earlier filed application, Ser. No. 473,342, filed May 28, 1974 now U.S. Pat. No. 3,955,728.

BACKGROUND OF THE INVENTION

A. Field of the Invention

This invention relates to an accessory bag adapted to be supported between the handlebars of a cycle or alternatively used as a shoulder bag.

B. Prior Art

A convenient accessory for a bicycle or motorcycle is a carrier bag which mounts on the handlebars and provides means for carrying along small, portable articles. Such bags are commonly constructed of a flexible fabric or sheet material that makes for light weight and low cost.

Bags constructed in this manner, however, are susceptible to being distended or disoriented by the influence of their contents if they are not adequately secured in position. For example, when the bag is secured to the handlebars with a pair of conventional buckle straps, the bag's center of gravity is forward of the handlebars and the bag may be caused to rotate with respect to the handlebars either under its own weight or when the cycle hits a bump or is otherwise disturbed. In addition, limited lateral support is provided by conventional strap fasteners and the bag is further susceptible of being displaced sideways.

The disadvantages associated with conventional means for securing the bag to the cycle have brought about a need to design fastening means which secure the position and shape of the bag, yet which do not in any way impede the safe operation of the cycle, including steering, braking and gear shifting.

BRIEF SUMMARY OF THE INVENTION

The present invention is directed toward a flexible carrier bag adaptable to be readily mountable and demountable between the handlebars of a cycle and which provides a minimum of interference with the steering or other operation of the cycle when stably positioned between and below the handlebars.

In one feature of the invention, the bag is supported between the handlebars by a bent wire "forward carrier". The carrier has a loop portion bent into a contour compatible for mounting with the handlebars stem. Extending forwardly from the loop portion are two closely spaced parallel segments which diverge lateraly from their outer ends for the length of the bag and then recontinue in a forward, parallel direction as projecting tines. The bag is preferably formed of fabric and is equipped with a pair of fabric channels on opposed lateral ends to receive the tines and a pair of releasable fasteners spaced along the rearward surface to encircle and secure the divergent segments. The elongated channels and releasable fasteners respectively inhibit lateral and forward displacement of the bag.

The bag may be further secured by a pair of elongated, tension members, each having one end attached to an opposed bottom edge of the bag and adapted to have the other end connected to the front axle area of the cycle. The effect of the tension members is to provide a force which pulls the bag downwardly against the vertical support provided by the forward carrier.

In a further feature of the invention, the elongated, tension members are used in cooperation with a pair of elongated straps, each of which have one end attached to the bag, and which extend therefrom to wrap around the handlebars for a secure grip.

Further additions, modifications, and advantages of these described features will be made apparent in the following detailed description

BRIEF DESCRIPTION OF THE DRAWINGS

FIG. 5 is a perspective view of an alternative embodiment of the invention using the elongated tension cords in cooperation with a pair of elongated, flexible straps which wrap about the handlebars; and, FIG. 6 is an elevational view of the bag of FIG. 5 removed from the bicycle.

DETAILED DESCRIPTION OF THE SPECIFIC EMBODIMENT

Figure 1:
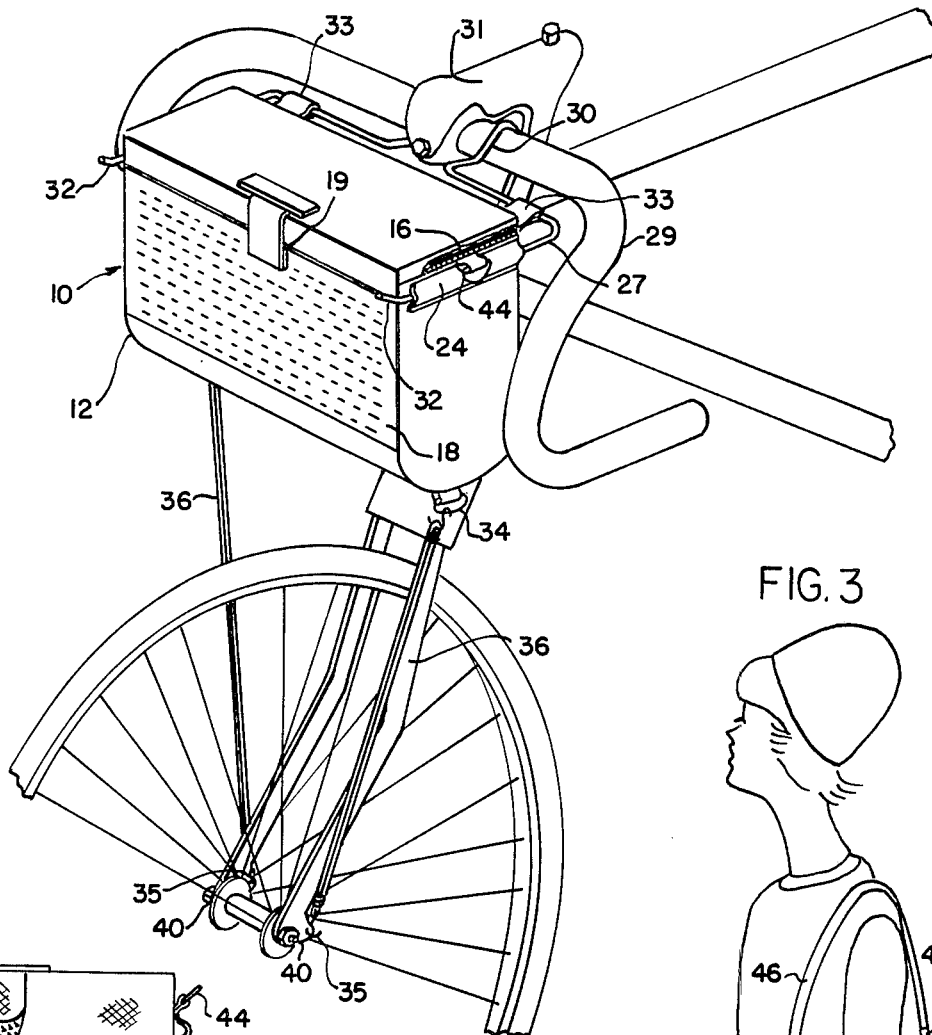
FIG. 1 is a perspective view of a carrier bag formed in accordance with the present invention and secured to the handlebars of a bicycle by means of a bent wire forward carrier and to the front axle of the bicycle by means of elongated, tension cords.

With reference to FIG. 1, a carrier bag, generally indicated at 10, is of rectangular shape modified to have a rounded or contoured bottom surface 12. The bag 10 may be formed from any sheet material, such as canvas, nylon, vinyl or the like, that will allow it to have a resilient and flexible structure. The bag 10 is preferably about 10 inches long, as that size bag conveniently fits between the handlebars 29 of most bicycles, and may have transverse dimensions of about half its length.

Access to the bag 10 is through a zippered opening 16 extending over three of the four sides of the upper perimeter of the bag. A rectangular pocket 18 of a stretchable fabric is also sewn to the bag 10 at its bottom and two of its sides, with its top open. A Velcro fastener 19 having its hooked member and piled member in cooperative positions on the pocket 18 and bag 10 respectively, provides means to secure the closure of the pocket. Small articles may be easily inserted into the pocket from the top and are retained between the stretch fabric and the underlying bag material.

Figure 2:
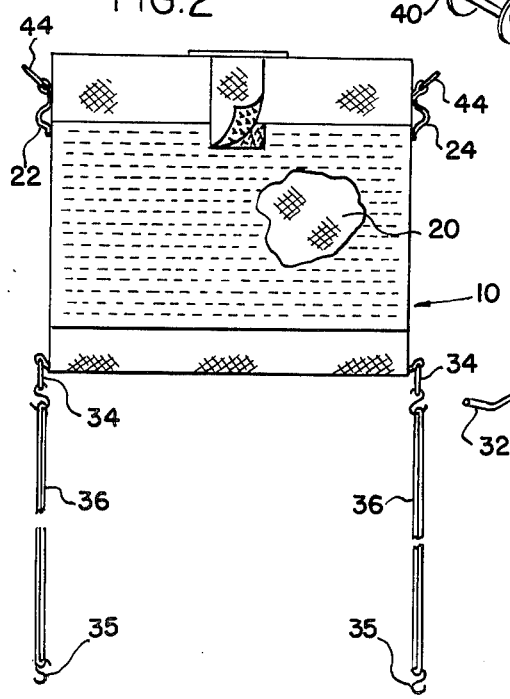
FIG. 2 is an elevational view of the bag of FIG. 1, removed from the bicycle, partially broken away for purposes of illustration.

As seen in FIG. 2, a sheet of flexible but tenacious material 20, such as foam plastic, having dimensions slightly smaller than the bag 10 is disposed within the bag and acts resiliently to urge the bag into the modified rectangular shape as well as to provide a protective cushion for the contents of the bag.

Figure 4:
FIG. 4 is a perspective view of the bent wire carrier.

The bag 10 is supported on the cycle by a bent wire forward carrier, generally indicated at 27 in FIG. 4. The carrier 27 includes a pair of closely spaced parallel segments 28 terminating at one end in a rounded portion 30. This rounded end portion 30 is bent to have a semicircular profile which, when mounted on the bicycle, will extend over the handlebars 29 and under the horizontal stem 31. The abutment of the rounded end portion 30 with the underside of the horizontal stem 31 will provide support for the weight of the bag 10 when positioned forward of the handlebars 29.

The opposite ends of the closely spaced parallel segments 28 join with two laterally diverging segments 25 which extend the length of the bag 10 and then recontinue in a forward, parallel direction as projecting tines 26. The tines 26 each terminate in a short end segment 32 skewed slightly upwardly with respect to the course of the forks, or, alternatively may terminate in a bulbous portion; either being intended to lessen the danger to pedestrians.

To provide means for mounting the bag 10 onto the forward carrier 27, the bag is seen in FIG. 2 to include a pair of elongated horizontal channel sections 22 and 24 formed across the top of its two opposed lateral ends, just below the zipper 16 and the top edges thereof, by sewing or otherwise securing strips of fabric along a pair of parallel lines, and leaving slack in the section of fabric between the lines. In the preferred embodiment these channels 22 and 24 are open at both ends, although in alternative embodiments, the forward end of the channel might be closed off. The bag 10 further includes a pair of releasable fasteners 33, preferably Velcro fasteners, which use the complementary hook and pile type sections, attached to the bag on the rear face proximate the top edge and spaced on either side of center.

The elongated channels 22 and 24 are adapted to receive the passage of the tines 26 therethrough and thereby inhibit lateral displacement of the bag 10. The releasable fasteners 33 are adapted to receive and encircle the laterally extending segments 25 of the carrier 27 and thereby inhibit longitudinal displacement of the bag 10. Engagement of the elongated channels 22 and 24 and releasable fasteners 33 with the forward carrier 27 will amply secure the bag 10 on the cycle.

To supplement the support provided by the forward carrier 27, a pair of elongated, tension members or cords 36 are extended from the bag 10 to the front fork ends 40 of the bicycle. The bag 10 is provided with a pair of metal D-rings 34, each proximate the lower edge of an opposed lateral end. One end of each cord 36 is connected to the D-ring 34, through means such as an S-hook 35. The free ends of the cords 36 have connector means, again, preferably S-hooks 35, which are adapted to engage eyelets commonly attached to the front fork ends 40. In the event a cycle is not provided with the design shown at 40, as is generally the case with fenderless racing bicycles, the S-hook at the bottom of the elongated cord can also engage the cut out portion of the front fork end.

The elongated, tension members or cords 36 are preferably formed from a bundle of elastic fibers bound with a woven, synthetic cloth jacket. However, in practice the cords 36 may be of any construction which will support a tension force. The cords 36 should be of such length that they will be elastically extended in order to make their respective engagements with the bag 10 and the front axle area 40. Accordingly, they exert a downward force on the lower end of the bag 10. This force takes up any slack which may exist by virtue of the support between the carrier tines 26 and resiliently stabilizes the bag 10 in its position between and below the handlebars 29. The bag 10 is thus suspended at its upper end by the forward carrier 27 and is secured downwardly by the cords 36.

In another feature of the invention, the cords 36 are used in cooperation with upper support means alternative from the forward carrier 27 to support the bag. An illustration of this alternative embodiment is seen in FIG. 5.

Shown therein is a bag, generally indicated at 110, which is cylindrical in shape, having a pair of spaced circular ends 112 joined by a cylindrical central section 114. The bag 110 is of such length to allow it to conveniently fit within the contour of the handlebars 128, and may have a diameter of about half its length.

A number of features associated with the bag in the earlier described embodiment attend the present bag. A zippered opening 116 extending the full length of the bag between the end sections 112 provides access to the inside of the bag. A rectangular pocket 118 of a stretchable fabric is also sewn to the bag, at its bottom and two of its sides, with its top open. Small articles may be easily inserted into the pocket from the top and are retained between the stretch fabric and the underlying bag material. As seen in FIG. 6, a sheet of foam plastic 120, having dimensions slightly smaller than the developed cylindrical surface 114, is disposed within the bag and acts to resiliently urge the bag into a cylindrical shape as well as to act as a protective cushion for the contents of the bag.

Broadly, the means chosen to secure the bag 110 to the handlebars 128 is a wrap of a pair of straps 122, each having one end affixed to the bag, about the handlebars, and securing the free ends of the straps to the bag through releasable fastener means. This means of handlebars attachment is merely for purposes of illustration, as the use of alternative means for the handlebars attachment remains within the scope of the invention.

Specifically, FIG. 6 shows a pair of elongated straps 122 formed of woven nylon webbing each having one end fastened to the bag 110. One strap 122 is sewn to the cylindrical surface 114 adjacent to one end section 112 and the other strap is joined to the cylindrical surface 114 adjacent to the opposed end section 112 so that the line between their points of joinder extends longitudinally along the surface 114. The straps are preferably each about 12 inches long and each has a hook type section of Velcro fastener 124 sewn on one side of its free end. An elongated strip of loop type Velcro fastener 126 is sewn to the cylindrical surface 114 so as to extend between the points at which the two straps 122 are fastened to the bag.

As shown in FIG. 5, the bag 110 is attached to the handlebars 128 of a bicycle by wrapping the two straps 122 around opposed sections of the handlebars and then securing the free ends of the straps to the bag by bringing the hook sections 124 into contact with the elongated loop section 126. The straps 122 may be conveniently anchored in position on the handlebars 128 by wrapping them around the base of the handbrake levers 130 or similar gear shift levers. The flat straps 122 do not obstruct the handlebar 128 or the levers 130 so as to interfere with normal operation of the bicycle.

A pair of webbing sections 132 are sewn diametrically downwardly across the outer sides of the two circular bag ends 112 from points adjacent to points of joinder of the straps 122 to the bag 110. The webbing sections 132 carry metal D-rings 134 at their lower ends. A pair of elongated, tension members or cords 136 each have one of their ends affixed to one of the D-rings 134. The cords 136 are preferably of the construction detailed in the earlier-described embodiment. The cords are of such length that they are elastically extended to make this engagement and accordingly exert a downward force on the lower end of the bag. This force resiliently stabilizes the bag in its position between and below the handlebars. The webbings 32 act to prevent this downward force from disforming the bag.

By supporting a bag in the manner shown in either of the described embodiments, the rider can conveniently insert and remove articles from the zippered openings 16 and 116 and pockets 18 and 118 without demounting from the cycle. The bags can be conveniently mounted or demounted from the cycle in a manner of seconds and when in position are substantially immune to accidental displacement.

Figure 3:
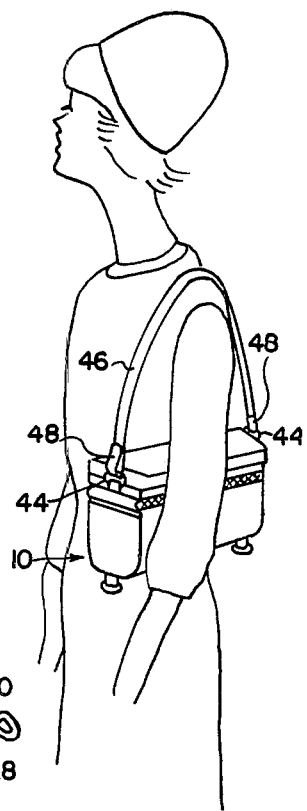
FIG. 3 is a perspective view of the bag of FIG. 1, with an auxiliary shoulder strap being used as a shoulder bag.

Both bag 10 of FIG. 1 and bag 110 of FIG. 5 are of such weight and dimension to be adaptable to be carried on the person when demounted from the bicycle. To facilitate this transition, a pair of D-rings, 44 and 133 in FIGS. 1 and 5 respectively, are sewn to opposed top sides of the bag. As shown in FIG. 3, a shoulder strap 46 may be attached to these D-rings by clips 48 formed at its opposed ends. When the shoulder strap 46 is used, cords 36 and 136, for bags 10 and 110 respectively, may either be removed from the bag, or they may be conveniently wrapped around the bag to prevent them from hanging.

The carrier bag of the present invention is therefore seen to be simple in construction to be low in cost, adaptable to easy attachment and removal from the bicycle, and further adaptable to alternative use as a shoulder bag.

The embodiments of the invention in which an exclusive property or privilege is claimed are defined as follows:

1. An article carrier that is supported forward of the handlebars of a cycle comprising:
   a frame comprised of a single elongated section having a pair of rigid parallel spaced end sections and having a central section adapted to extend under and bear against the upper stem of said handlebars and also extending over the upper surface of said handlebars to be supported on said upper surface, said frame further including a pair of laterally diverging segments, one each connecting each of said end sections with a respective portion of said central section extending over said handlebar, said end sections extending forwardly from the handlebars, on opposed sides of the steering post, in a generally horizontal attitude when said frame is positioned on said cycle; and,
   a closed bag dimensioned to fit between said end sections formed of a flexible sheet material and having openings formed on the sides of said bag adapted to slidably receive said end sections to enable mounting of said bag onto said frame;
   fastening means securing said bag against longitudinal displacement on said end sections;
   an access opening formed in said bag intermediate said end sections when said bag is mounted on said frame; and
   closure means associated with the opening, whereby said bag may be slid onto said frame between said end sections and secured thereto by said fastener means to support said bag on said frame on at least two sides of the upper perimeter of said bag to prevent buckling of the edges of said bag.

2. The article carrier of claim 1 wherein said fastener means includes means affixed to the upper portion of a rearward face that is normal to the opposed, lateral ends of the closed bag for receiving and encircling the divergent segments.

3. The article carrier of claim 2 wherein the means for receiving and encircling the divergent segments are Velcro fasteners.

4. The article carrier of claim 1 wherein the pair of rigid elongated members each terminate at their forward end in a short skewed segment.

5. The article carrier of claim 1 wherein the openings receiving the rigid elongated members comprises a pair of elongated channels, each having closed sides and at least one open end, which are formed parallel to one another in a generaly horizontal attitude.

6. The article carrier of claim 5 wherein the elongated channels are formed by sections of fabric sewn to the side of the bag along two parallel lines.

7. The article carrier of claim 1 wherein the means for supporting the bag further comprises a pair of elongated tension members, each tension member having one end connected to the bag at one of a pair of points spaced from one another, and means attached to the free end of each tension member connecting the tension member adjacent the front axle area of the cycle.

8. The article carrier of claim 7 wherein the pair of elongated tension members are connected to opposed lateral ends of the bag proximate the lower edge thereof.

9. The article carrier of claim 1 wherein the bag further includes a pocket on its front face formed by securing a portion of the periphery of a sheet of stretchable fabric to the face.

10. The article carrier of claim 9 wherein the sheet of fabric is meshed.

11. The article carrier of claim 1 further comprising a pair of rings, each ring being attached to opposed lateral ends of the bag proximate the top, and an elongated strap having means attached to each of its ends for engaging respective rings, thereby providing a shoulder strap for carrying the bag when demounted from the cycle.

12. An article carrier that is supported forward of the handlebars of a cycle comprising:
    an enclosed bag formed of a flexible sheet material and have an upper and lower portions and an access opening;
    means for attaching the bag to the handlebars including means attached to the upper portion of the bag; and
    a pair of elongated, tension members,
    each tension member having one end connected to the bag at one of a pair of points spaced from one another at the lower portion thereof, and its free end connected to means attaching the tension member adjacent the front axle of the cycle,
    whereby said flexible bag is placed in tension by said tension members to define said bag shape and act as a stabilizing suspension system for said carrier.

13. The article carrier of claim 12 wherein the elongated, tension members are elastically extendible.

14. The article carrier of claim 12 wherein the elongated, tension members are elasticized.

15. The article carrier of claim 12 wherein the means for attaching the tension member is an S-hook.

16. The article carrier of claim 12 wherein the pair of points spaced from one another are proximate the bottom edges of opposed, lateral surfaces of the bag.

17. An article carrier that is supported forward of the handlebars of a cycle comprising: a frame including a pair of rigid elongated members having means for securement to the handlebars of the cycle so as to extend forwardly from the handlebars, on opposed sides of the steering post, in a generally horizontal attitude and in substantially parallel alignment; and, a closed bag formed of a flexible sheet material mountable on the frame and having, an access opening formed in the upper portion of the closed bag, closure means associated with the opening comprising a zipper extending about the perimeter of the closed bag, and means affixed to the upper portion of opposed lateral ends of the bag below said zipper for receiving and encircling the rigid elongated members, said means positioning said closed bag forward of the juncture stem of said handlebars along the sides of the closed bag whereby said elongated members maintain the bag shape to enable one-handed manipulation of said zipper.

18. The article carrier of claim 17 wherein the pair of rigid elongated members comprise the opposed ends of a single elongated section which is secured to the handlebars by a central section that abuts the stem of the handlebars.

19. The article carrier of claim 18 further comprising means affixed to the upper portion of a rearward face that is normal to the opposed, lateral ends of the closed bag for receiving and encircling the single elongated sections.

* * * * *